US009894261B2

(12) United States Patent
Flannery (10) Patent No.: US 9,894,261 B2
(45) Date of Patent: Feb. 13, 2018

(54) SYSTEMS AND METHODS FOR PRESENTING DIGITAL VIDEO MANAGEMENT SYSTEM INFORMATION VIA A USER-CUSTOMIZABLE HIERARCHICAL TREE INTERFACE

(75) Inventor: Mark Flannery, North Ryde (AU)

(73) Assignee: Honeywell International Inc., Morris Plains, NJ (US)

( * ) Notice: Subject to any disclaimer, the term of this patent is extended or adjusted under 35 U.S.C. 154(b) by 394 days.

(21) Appl. No.: 14/129,086

(22) PCT Filed: Jun. 22, 2012

(86) PCT No.: PCT/AU2012/000721
§ 371 (c)(1),
(2), (4) Date: Dec. 23, 2013

(87) PCT Pub. No.: WO2012/174603
PCT Pub. Date: Dec. 27, 2012

(65) Prior Publication Data
US 2014/0125808 A1  May 8, 2014

(30) Foreign Application Priority Data

Jun. 24, 2011  (AU) ................................ 2011902484

(51) Int. Cl.
*H04N 5/232* (2006.01)
*H04N 5/247* (2006.01)
*H04N 7/18* (2006.01)

(52) U.S. Cl.
CPC ......... *H04N 5/23206* (2013.01); *H04N 5/247* (2013.01); *H04N 7/181* (2013.01)

(58) Field of Classification Search
CPC ......... G06F 17/30598; G06F 17/30053; G06F 17/30327; G06F 17/30572; G06F 17/30589; G06F 17/30961; G06F 17/30994
See application file for complete search history.

(56) References Cited

U.S. PATENT DOCUMENTS 3,753,232 A   8/1973  Sporer
3,806,911 A   4/1974  Pripusich
(Continued)

FOREIGN PATENT DOCUMENTS

CA   2240881   12/1999
CN   1265762   9/2000
(Continued)

OTHER PUBLICATIONS

Smith, "Working with Checkboxes in the WPF TreeView", http://www.codeproject.com/Articles/28306/Working-with-Checkboxes-in-the-WPF-TreeView, Aug. 1, 2008.*
(Continued)

*Primary Examiner* — Jennifer To
*Assistant Examiner* — Joseph R Burwell
(74) *Attorney, Agent, or Firm* — Seager, Tufte & Wickhem, LLP (57) ABSTRACT

Described herein are systems and methods for presenting DVM system information. In overview, a hierarchical tree structure is used to display DVM system elements (such as cameras). The tree structure is defined by a plurality of nodes arranged in hierarchical levels. Each level in the tree structure corresponds to an element characteristic. The nodes for each level correspond to element characteristic values. For example, one level might correspond to "camera status", and the nodes at that level each define camera status values (e.g. operational or non-operational). A tree customization mod-
(Continued)

ule allows a user to customize the tree structure by designating element characteristics for levels in the tree structure.

15 Claims, 5 Drawing Sheets

(56) References Cited

U.S. PATENT DOCUMENTS

| | | |
|---|---|---|
| 3,857,018 A | 12/1974 | Stark et al. |
| 3,860,911 A | 1/1975 | Hinman et al. |
| 3,866,173 A | 2/1975 | Moorman et al. |
| 3,906,447 A | 9/1975 | Crafton |
| 4,095,739 A | 6/1978 | Fox et al. |
| 4,146,085 A | 3/1979 | Wills |
| 4,148,012 A | 4/1979 | Baump et al. |
| 4,161,778 A | 7/1979 | Getson, Jr. et al. |
| 4,213,118 A | 7/1980 | Genest et al. |
| 4,283,710 A | 8/1981 | Genest et al. |
| 4,298,946 A | 11/1981 | Hartsell et al. |
| 4,332,852 A | 6/1982 | Korklan et al. |
| 4,336,902 A | 6/1982 | Neal |
| 4,337,893 A | 7/1982 | Flanders et al. |
| 4,353,064 A | 10/1982 | Stamm |
| 4,373,664 A | 2/1983 | Barker et al. |
| 4,379,483 A | 4/1983 | Farley |
| 4,462,028 A | 7/1984 | Ryan et al. |
| 4,525,777 A | 6/1985 | Webster et al. |
| 4,538,056 A | 8/1985 | Young et al. |
| 4,556,169 A | 12/1985 | Zervos |
| 4,628,201 A | 12/1986 | Schmitt |
| 4,646,964 A | 3/1987 | Parker et al. |
| 4,685,615 A | 8/1987 | Hart |
| 4,821,177 A | 4/1989 | Koegel et al. |
| 4,847,839 A | 7/1989 | Hudson, Jr. et al. |
| 5,070,468 A | 12/1991 | Niinomi et al. |
| 5,071,065 A | 12/1991 | Aalto et al. |
| 5,099,420 A | 3/1992 | Barlow et al. |
| 5,172,565 A | 12/1992 | Wruck et al. |
| 5,204,663 A | 4/1993 | Lee |
| 5,227,122 A | 7/1993 | Scarola et al. |
| 5,259,553 A | 11/1993 | Shyu |
| 5,271,453 A | 12/1993 | Yoshida et al. |
| 5,361,982 A | 11/1994 | Liebl et al. |
| 5,404,934 A | 4/1995 | Carlson et al. |
| 5,420,927 A | 5/1995 | Micali |
| 5,449,112 A | 9/1995 | Heitman et al. |
| 5,465,082 A | 11/1995 | Chaco |
| 5,479,154 A | 12/1995 | Wolfram |
| 5,481,481 A | 1/1996 | Frey et al. |
| 5,526,871 A | 6/1996 | Musser et al. |
| 5,541,585 A | 7/1996 | Duhame et al. |
| 5,591,950 A | 1/1997 | Imedio-Ocana |
| 5,594,429 A | 1/1997 | Nakahara |
| 5,604,804 A | 2/1997 | Micali |
| 5,610,982 A | 3/1997 | Micali |
| 5,631,825 A | 5/1997 | van Weele et al. |
| 5,640,151 A | 6/1997 | Reis et al. |
| 5,644,302 A | 7/1997 | Hana et al. |
| 5,663,957 A | 9/1997 | Dent |
| 5,666,416 A | 9/1997 | Micali |
| 5,717,757 A | 2/1998 | Micali |
| 5,717,758 A | 2/1998 | Micali |
| 5,717,759 A | 2/1998 | Micali |
| 5,732,691 A | 3/1998 | Maiello et al. |
| 5,774,058 A | 6/1998 | Henry et al. |
| 5,778,256 A | 7/1998 | Darbee |
| 5,793,868 A | 8/1998 | Micali |
| 5,844,553 A * | 12/1998 | Hao ............... G06F 9/4443 709/201 |
| 5,914,875 A | 6/1999 | Monta et al. |
| 5,915,473 A | 6/1999 | Ganesh et al. |
| 5,923,328 A * | 7/1999 | Griesmer ............ G06F 3/0481 715/769 |
| 5,923,817 A | 7/1999 | Nakamura |
| 5,927,398 A | 7/1999 | Maciulewicz |
| 5,930,773 A | 7/1999 | Crooks et al. |
| 5,960,083 A | 9/1999 | Micali |
| 5,973,613 A | 10/1999 | Reis et al. |
| 5,992,194 A | 11/1999 | Baukholt et al. |
| 6,072,402 A | 6/2000 | Kniffin et al. |
| 6,097,811 A | 8/2000 | Micali |
| 6,104,963 A | 8/2000 | Cebasek et al. |
| 6,119,125 A | 9/2000 | Gloudeman et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,233,954 B1 | 5/2001 | Mehaffey et al. |
| 6,241,156 B1 | 6/2001 | Kline et al. |
| 6,249,755 B1 | 6/2001 | Yemini et al. |
| 6,260,765 B1 | 7/2001 | Natale et al. |
| 6,268,797 B1 | 7/2001 | Berube et al. |
| 6,292,893 B1 | 9/2001 | Micali |
| 6,301,659 B1 | 10/2001 | Micali |
| 6,318,137 B1 | 11/2001 | Chaum |
| 6,324,854 B1 | 12/2001 | Jayanth |
| 6,334,121 B1 | 12/2001 | Primeaux et al. |
| 6,347,374 B1 | 2/2002 | Drake et al. |
| 6,366,558 B1 | 4/2002 | Howes et al. |
| 6,369,719 B1 | 4/2002 | Tracy et al. |
| 6,374,356 B1 | 4/2002 | Daigneault et al. |
| 6,393,848 B2 | 5/2002 | Roh et al. |
| 6,394,359 B1 | 5/2002 | Morgan |
| 6,424,068 B2 | 7/2002 | Nakagashi |
| 6,453,426 B1 | 9/2002 | Gamache et al. |
| 6,453,687 B2 | 9/2002 | Sharood et al. |
| 6,483,697 B1 | 11/2002 | Jenks et al. |
| 6,487,658 B1 | 11/2002 | Micali |
| 6,490,610 B1 | 12/2002 | Rizvi et al. |
| 6,496,575 B1 | 12/2002 | Vasell et al. |
| 6,516,357 B1 | 2/2003 | Hamann et al. |
| 6,518,953 B1 | 2/2003 | Armstrong |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,583,712 B1 | 6/2003 | Reed et al. |
| 6,604,023 B1 | 8/2003 | Brown et al. |
| 6,615,594 B2 | 9/2003 | Jayanth et al. |
| 6,628,997 B1 | 9/2003 | Fox et al. |
| 6,647,317 B2 | 11/2003 | Takai et al. |
| 6,647,400 B1 | 11/2003 | Moran |
| 6,658,373 B2 | 12/2003 | Rossi et al. |
| 6,663,010 B2 | 12/2003 | Chene et al. |
| 6,665,669 B2 | 12/2003 | Han et al. |
| 6,667,690 B2 | 12/2003 | Durej et al. |
| 6,741,915 B2 | 5/2004 | Poth |
| 6,758,051 B2 | 7/2004 | Jayanth et al. |
| 6,766,450 B2 | 7/2004 | Micali |
| 6,789,739 B2 | 9/2004 | Rosen |
| 6,796,494 B1 | 9/2004 | Gonzalo |
| 6,801,849 B2 | 10/2004 | Szukala et al. |
| 6,801,907 B1 | 10/2004 | Zagami |
| 6,826,454 B2 | 11/2004 | Sulfstede |
| 6,829,332 B2 | 12/2004 | Farris et al. |
| 6,851,621 B1 | 2/2005 | Wacker et al. |
| 6,871,193 B1 | 3/2005 | Campbell et al. |
| 6,886,742 B2 | 5/2005 | Stoutenburg et al. |
| 6,895,215 B2 | 5/2005 | Uhlmann |
| 6,910,135 B1 | 6/2005 | Grainger |
| 6,967,612 B1 | 11/2005 | Gorman et al. |
| 6,969,542 B2 | 11/2005 | Klasen-Memmer et al. |
| 6,970,070 B2 | 11/2005 | Juels et al. |
| 6,973,410 B2 | 12/2005 | Seigel |
| 6,983,889 B2 | 1/2006 | Alles |
| 6,989,742 B2 | 1/2006 | Ueno et al. |
| 7,004,401 B2 | 2/2006 | Kallestad |
| 7,019,614 B2 | 3/2006 | Lavelle et al. |
| 7,032,114 B1 | 4/2006 | Moran |
| 7,055,759 B2 | 6/2006 | Wacker et al. |
| 7,076,083 B2 | 7/2006 | Blazey |
| 7,117,356 B2 | 10/2006 | LaCous |
| 7,124,943 B2 | 10/2006 | Quan et al. |
| 7,130,719 B2 | 10/2006 | Ehlers et al. |
| 7,183,894 B2 | 2/2007 | Yui et al. |

(56) References Cited

U.S. PATENT DOCUMENTS

| | | | |
|---|---|---|---|
| 7,194,538 B1 * | 3/2007 | Rabe | G06F 3/0605 709/220 |
| 7,203,962 B1 | 4/2007 | Moran | |
| 7,205,882 B2 | 4/2007 | Libin | |
| 7,216,007 B2 | 5/2007 | Johnson | |
| 7,216,015 B2 | 5/2007 | Poth | |
| 7,218,243 B2 | 5/2007 | Hayes et al. | |
| 7,222,800 B2 | 5/2007 | Wruck | |
| 7,233,243 B2 | 6/2007 | Roche et al. | |
| 7,243,001 B2 | 7/2007 | Janert et al. | |
| 7,245,223 B2 | 7/2007 | Trela | |
| 7,250,853 B2 | 7/2007 | Flynn | |
| 7,274,676 B2 | 9/2007 | Cardei et al. | |
| 7,283,489 B2 | 10/2007 | Palaez et al. | |
| 7,313,819 B2 | 12/2007 | Burnett et al. | |
| 7,321,784 B2 | 1/2008 | Serceki et al. | |
| 7,337,315 B2 | 2/2008 | Micali | |
| 7,343,265 B2 | 3/2008 | Andarawis et al. | |
| 7,353,396 B2 | 4/2008 | Micali et al. | |
| 7,362,210 B2 | 4/2008 | Bazakos et al. | |
| 7,376,839 B2 | 5/2008 | Carta et al. | |
| 7,379,997 B2 | 5/2008 | Ehlers et al. | |
| 7,380,125 B2 | 5/2008 | Di Luoffo et al. | |
| 7,383,158 B2 | 6/2008 | Krocker et al. | |
| 7,397,371 B2 | 7/2008 | Martin et al. | |
| 7,408,925 B1 | 8/2008 | Boyle et al. | |
| 7,468,662 B2 | 12/2008 | Velipasalar et al. | |
| 7,487,538 B2 | 2/2009 | Mok | |
| 7,505,914 B2 | 3/2009 | McCall | |
| 7,542,867 B2 | 6/2009 | Steger et al. | |
| 7,543,327 B1 | 6/2009 | Kaplinsky | |
| 7,574,734 B2 | 8/2009 | Fedronic et al. | |
| 7,576,770 B2 | 8/2009 | Metzger et al. | |
| 7,583,401 B2 | 9/2009 | Lewis | |
| 7,586,398 B2 | 9/2009 | Huang et al. | |
| 7,600,679 B2 | 10/2009 | Kshirsagar et al. | |
| 7,634,662 B2 | 12/2009 | Monroe | |
| 7,661,603 B2 | 2/2010 | Yoon et al. | |
| 7,683,940 B2 | 3/2010 | Fleming | |
| 7,735,132 B2 | 6/2010 | Brown et al. | |
| 7,735,145 B2 | 6/2010 | Kuehnel et al. | |
| 7,794,536 B2 | 9/2010 | Roy et al. | |
| 7,801,870 B2 | 9/2010 | Oh et al. | |
| 7,818,026 B2 | 10/2010 | Hartikainen et al. | |
| 7,839,926 B1 | 11/2010 | Metzger et al. | |
| 7,853,987 B2 | 12/2010 | Balasubramanian et al. | |
| 7,861,314 B2 | 12/2010 | Serani et al. | |
| 7,873,441 B2 | 1/2011 | Synesiou et al. | |
| 7,907,753 B2 | 3/2011 | Wilson et al. | |
| 7,937,669 B2 | 5/2011 | Zhang et al. | |
| 7,983,892 B2 | 7/2011 | Anne et al. | |
| 7,995,526 B2 | 8/2011 | Liu et al. | |
| 7,999,847 B2 | 8/2011 | Donovan et al. | |
| 8,045,960 B2 | 10/2011 | Orakkan | |
| 8,069,144 B2 | 11/2011 | Quinlan et al. | |
| 8,089,341 B2 | 1/2012 | Nakagawa et al. | |
| 8,095,889 B2 | 1/2012 | DeBlaey et al. | |
| 8,102,240 B2 | 1/2012 | Birchbauer et al. | |
| 8,108,200 B2 | 1/2012 | Anne et al. | |
| 8,166,532 B2 | 4/2012 | Chowdhury et al. | |
| 8,174,572 B2 | 5/2012 | Buehler et al. | |
| 8,179,227 B2 | 5/2012 | Dziadosz | |
| 8,199,196 B2 | 6/2012 | Klein et al. | |
| 8,222,990 B2 | 7/2012 | Gerner et al. | |
| 8,232,860 B2 | 7/2012 | Goel | |
| 8,272,053 B2 | 9/2012 | Markham et al. | |
| 8,316,407 B2 | 11/2012 | Lee et al. | |
| 8,341,695 B2 | 12/2012 | Thomas et al. | |
| 8,350,666 B2 | 1/2013 | Kore | |
| 8,351,350 B2 | 1/2013 | Bhandari et al. | |
| 8,479,029 B2 | 6/2013 | Adams et al. | |
| 8,509,987 B2 | 8/2013 | Resner | |
| 8,605,151 B2 | 12/2013 | Bellamy et al. | |
| 8,922,658 B2 | 12/2014 | Galvin | |
| 9,036,828 B2 | 5/2015 | Schambeck | |
| 2002/0011923 A1 | 1/2002 | Cunningham et al. | |
| 2002/0016971 A1 * | 2/2002 | Berezowski | G08B 13/19693 725/105 |
| 2002/0022991 A1 | 2/2002 | Sharood et al. | |
| 2002/0046337 A1 | 4/2002 | Micali | |
| 2002/0118096 A1 | 8/2002 | Hoyos et al. | |
| 2002/0121961 A1 | 9/2002 | Huff | |
| 2002/0165824 A1 | 11/2002 | Micali | |
| 2002/0170064 A1 | 11/2002 | Monroe et al. | |
| 2003/0033230 A1 | 2/2003 | McCall | |
| 2003/0071714 A1 | 4/2003 | Bayer et al. | |
| 2003/0174049 A1 | 9/2003 | Beigel et al. | |
| 2003/0208689 A1 | 11/2003 | Garza | |
| 2003/0233432 A1 | 12/2003 | Davis et al. | |
| 2004/0061714 A1 * | 4/2004 | Sinclair | G06F 9/4443 715/705 |
| 2004/0062421 A1 | 4/2004 | Jakubowski et al. | |
| 2004/0064453 A1 | 4/2004 | Ruiz et al. | |
| 2004/0068583 A1 | 4/2004 | Monroe et al. | |
| 2004/0087362 A1 | 5/2004 | Beavers | |
| 2004/0125124 A1 * | 7/2004 | Kim | G06F 17/30799 715/716 |
| 2004/0205350 A1 | 10/2004 | Waterhouse et al. | |
| 2004/0229200 A1 * | 11/2004 | McKeon | H04N 21/241 434/350 |
| 2004/0267694 A1 * | 12/2004 | Sakai | G06F 17/30876 707/999.001 |
| 2005/0138380 A1 | 6/2005 | Fedronic et al. | |
| 2005/0200714 A1 | 9/2005 | Marchese | |
| 2006/0070010 A1 * | 3/2006 | Retlich | G06F 9/4443 715/798 |
| 2006/0085380 A1 * | 4/2006 | Cote | G06F 8/20 707/999.001 |
| 2006/0017939 A1 | 6/2006 | Jamieson et al. | |
| 2006/0265403 A1 * | 11/2006 | Mercer | G06F 17/30056 707/999.01 |
| 2007/0109098 A1 | 5/2007 | Siemon et al. | |
| 2007/0132550 A1 | 6/2007 | Avraham et al. | |
| 2007/0171862 A1 | 7/2007 | Tang et al. | |
| 2007/0268145 A1 | 11/2007 | Bazakos et al. | |
| 2007/0272744 A1 | 11/2007 | Bantwal et al. | |
| 2008/0037432 A1 * | 2/2008 | Cohen | H04L 41/142 370/241 |
| 2008/0173709 A1 | 7/2008 | Ghosh | |
| 2009/0018900 A1 | 1/2009 | Waldron et al. | |
| 2009/0063517 A1 * | 3/2009 | Wright | G06F 17/30274 707/999.1 |
| 2009/0080443 A1 | 3/2009 | Dziadosz | |
| 2009/0086692 A1 | 4/2009 | Chen | |
| 2009/0097815 A1 | 4/2009 | Lahr et al. | |
| 2009/0164946 A1 | 6/2009 | Liddington | |
| 2009/0168695 A1 | 7/2009 | Johar et al. | |
| 2009/0258643 A1 | 10/2009 | McGuffin | |
| 2009/0266885 A1 | 10/2009 | Marcinowski et al. | |
| 2009/0292995 A1 | 11/2009 | Anne et al. | |
| 2009/0328203 A1 | 12/2009 | Haas | |
| 2010/0023598 A9 * | 1/2010 | Ginter | G06F 21/55 709/217 |
| 2010/0026811 A1 | 2/2010 | Palmer | |
| 2010/0036511 A1 | 2/2010 | Dongare | |
| 2010/0220715 A1 | 9/2010 | Cherchali et al. | |
| 2010/0269173 A1 | 10/2010 | Srinvasa et al. | |
| 2010/0306364 A1 * | 12/2010 | Terry | H04L 12/66 709/224 |
| 2011/0041099 A1 * | 2/2011 | Weise | G06F 3/0482 715/854 |
| 2011/0043631 A1 | 2/2011 | Marman et al. | |
| 2011/0071929 A1 | 3/2011 | Morrison | |
| 2011/0115602 A1 | 5/2011 | Bhandari et al. | |
| 2011/0133884 A1 | 6/2011 | Kumar et al. | |
| 2011/0153791 A1 | 6/2011 | Jones et al. | |
| 2011/0167488 A1 | 7/2011 | Roy et al. | |
| 2011/0181414 A1 | 7/2011 | G et al. | |
| 2012/0096131 A1 | 4/2012 | Bhandari et al. | |
| 2012/0106915 A1 | 5/2012 | Palmer | |
| 2012/0121229 A1 | 5/2012 | Lee | |
| 2012/0133482 A1 | 5/2012 | Bhandari et al. | |
| 2012/0326868 A1 | 12/2012 | Goel | |

(56) References Cited

U.S. PATENT DOCUMENTS

| | | | | |
|---|---|---|---|---|
| 2013/0010111 | A1* | 1/2013 | Laforte | G08B 13/19645 348/143 |
| 2013/0036356 | A1 | 2/2013 | Worrill et al. | |
| 2013/0194430 | A1 | 8/2013 | Worrill | |
| 2015/0363478 | A1* | 12/2015 | Haynes | G06F 17/30575 707/625 |

FOREIGN PATENT DOCUMENTS

| | | |
|---|---|---|
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 | 3/2006 |
| GB | 2251266 | 7/1992 |
| GB | 2390705 | 1/2004 |
| JP | 6019911 | 1/1994 |
| JP | 2003/074942 | 3/2003 |
| JP | 2003/240318 | 8/2003 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | WO 00/76220 | 12/2000 |
| WO | WO 01/42598 | 6/2001 |
| WO | WO 01/57489 | 8/2001 |
| WO | WO 01/60024 | 8/2001 |
| WO | WO 02/32045 | 4/2002 |
| WO | WO 02/091311 | 11/2002 |
| WO | WO 03/090000 | 10/2003 |
| WO | WO 2004/092514 | 10/2004 |
| WO | WO 2005/038727 | 4/2005 |
| WO | WO 2006/021047 | 3/2006 |
| WO | WO 2006/049181 | 5/2006 |
| WO | WO 2006/126974 | 11/2006 |
| WO | WO 2007/043798 | 4/2007 |
| WO | WO 2008/045918 | 4/2008 |
| WO | WO 2008/144803 | 12/2008 |
| WO | WO 2010/039598 | 4/2010 |
| WO | WO 2010/106474 | 9/2010 |

OTHER PUBLICATIONS

Black et al., "Hierarchical database for a multi-camera surveillance system", Pattern Anal. Applic. (2005) 7: 430-446.*
Brandel, "VMS: How to Manage Surveillance Video", CSO Online, http://www.csoonline.com/article/2123995/building-area-security/vms--how-to-manage-surveillance-video.html, May 12, 2009.*
Bynet Inc., "Dynamic Video Management Software (VMS) Solution", Jun. 2010.*
Cisco Inc., "Cisco Urban Security Design Guide", Jun. 2, 2010.*
"The Top 10 Open Video Management Systems", Security Magazine, http://www.securitymagazine.com/articles/80513-the-top-10-open-video-management-systems-1, Feb. 1, 2010.*
Triangle Computer and Telephone Inc., "Video Management Systems", http://www.trianglecomputer.com/video-management-system.html, 2011.*
Ebse, "Tri-State TreeView Control", https://www.codeproject.com/kb/tree/tristatetreeviewsubmissio.aspx, Nov. 2, 2005.*
"Certificate Validation Choices," CoreStreet, Inc., 8 pages, 2002.
"CoreStreet Cuts the PKI Gordian Knot," Digital ID World, pp. 22-25, Jun./Jul. 2004.
"Distributed Certificate Validation," CoreStreet, Ltd., 17 pages, 2006.
"Identity Services Infrastructure," CoreStreet Solutions—Whitepaper, 12 pages, 2006.
"Important FIPS 201 Deployment Considerations," Corestreet Ltd.—Whitepaper, 11 pages, 2005.
"Introduction to Validation for Federated PKI," Corestreet Ltd, 20 pages, 2006.
"Manageable Secure Physical Access," Corestreet Ltd, 3 pages, 2002.
"MiniCRL, Corestreet Technology Datasheet," CoreStreet, 1 page, 2006.
"Nonce Sense, Freshness and Security in OCSP Responses," Corestreet Ltd, 2 pages, 2003.
"Real Time Credential Validation, Secure, Efficient Permissions Management," Corestreet Ltd, 5 pages, 2002.
"The Role of Practical Validation for Homeland Security," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
"Keyfast Technical Overview", Corestreet Ltd., 21 pages, 2004.
Goldman et al., "Information Modeling for Intrusion Report Aggregation," IEEE, Proceedings DARPA Information Survivability Conference and Exposition II, pp. 329-342, 2001.
Honeywell, "Excel Building Supervisor-Integrated R7044 and FS90 Ver. 2.0," Operator Manual, 70 pages, Apr. 1995.
http://www.tcsbasys.com/products/superstats.asp, TCS/Basys Controls: Where Buildings Connect With Business, 2 pages, printed Aug. 26, 2003.
http://www.tcsbasys.com/products/sz1009.asp, TCS/Basys Controls: Where Buildings Connect With Business, 1 page, printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.
http://www.tcsbasys.com/products/sz1020series.asp, TCS/Basys Controls: Where Buildings Connect With Business, 2 pages, printed Aug. 26, 2003.
http://www.tcsbasys.com/products/sz1022.asp, TCS/Basys Controls: Where Buildings Connect With Business, 2 pages, printed Aug. 26, 2003.
http://www.tcsbasys.com/products/sz1024.asp, TCS/Basys Controls: Where Buildings Connect With Business, 2 pages, printed Aug. 26, 2003.
http://www.tcsbasys.com/products/sz1030series.asp, TCS/Basys Controls: Where Buildings Connect With Business, 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
http://www.tcsbasys.com/products/sz1031.asp, TCS/Basys Controls: Where Buildings Connect With Business, 2 pages, printed Aug. 26, 2003.

(56) References Cited

OTHER PUBLICATIONS

Trane, "System Programming, Tracer Summit Version 14, BMTW-SVP01D-EN," 623 pages, 2002.

* cited by examiner

SYSTEMS AND METHODS FOR PRESENTING DIGITAL VIDEO MANAGEMENT SYSTEM INFORMATION VIA A USER-CUSTOMIZABLE HIERARCHICAL TREE INTERFACE

This application is a National Stage of International Application No. PCT/AU2012/000721, filed Jun. 22, 2012, which claims the benefit of Australian Patent Application No. 2011902484, filed Jun. 24, 2011, both of which are incorporated herein by reference.

FIELD OF THE INVENTION

The present invention relates to systems and methods for presenting DVM system information. Embodiments of the invention have been particularly developed for providing a user-customizable hierarchical tree structure for organizing DVM system elements. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Digital Video Management (DVM) systems, such as those based on the Honeywell DVM model, are widely used. Such systems manage video data from a plurality of cameras, commonly being IP streaming cameras. In some cases, a plurality of cameras are assigned to a plurality camera servers, with each camera server being configured to make available (for live viewing or recording purposes) video data from an assigned one or more cameras. The camera servers are all centrally managed by a DVM database server.

It is not uncommon for a DVM system to include an unwieldy number of system cameras and other system elements. This creates significant challenges in terms of navigation, engineering and configuration of such systems.

SUMMARY OF THE INVENTION

It is an object of the present invention to overcome or ameliorate at least one of the disadvantages of the prior art, or to provide a useful alternative.

One embodiment provides a method for presenting DVM system information, the method including:

providing an interface for displaying DVM system elements in a hierarchical tree structure; wherein the hierarchical tree structure includes a plurality of nodes arranged in a plurality of levels, each node corresponding to an element characteristic value, such that elements having that element characteristic value are grouped under that node;

providing a tree customization module configured to receive instructions from a user indicative of:
  (i) a user designated element characteristic for a level in the tree structure; and
  (ii) a user designated location in the hierarchical tree structure for that level;
  in response to the instructions from the user, defining nodes for that level, wherein each node corresponds to a value for the user designated element characteristic; and;
  updating the hierarchical tree structure with the defined nodes.

One embodiment provides a DVM system configured to perform a method as described herein.

One embodiment provides a tangible non-transitive carrier medium carrying computer executable code that, when executed via one or more processes, allows the performance of a method as described herein.

One embodiment provides a DVM system including:
a DVM server communicatively coupled to a plurality of DVM system elements, the DVM system elements including a plurality of cameras and a plurality of camera servers;
a module, provided by the server, configured to enable rendering at one or more client terminals of a graphical interface that displays DVM system elements in a hierarchical tree structure; wherein the hierarchical tree structure includes a plurality of nodes arranged in a plurality of levels, each node corresponding to a DVM element characteristic value, such that DVM system elements having that DVM element characteristic value are grouped under that node;
a module, provided by the server, configured to enable rendering at one or more client terminals of a tree customization interface configured to receive instructions from a user indicative of:
  (i) a user designated DVM element characteristic for a level in the tree structure; and
  (ii) a user designated location in the hierarchical tree structure for that level;
a module configured to, in response to the instructions from the user, define nodes for that level, wherein each node corresponds to a value for the user designated DVM element characteristic; and;
a module configured to update the hierarchical tree structure with the defined nodes.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being imitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Embodiments of the invention will now be described, by way of example only, with reference to the accompanying drawings in which.

DETAILED DESCRIPTION

Described herein are systems and methods for presenting DVM system information. In overview, a hierarchical tree structure is used to display DVM system elements (such as cameras). The tree structure is defined by a plurality of nodes arranged in hierarchical levels. Each level in the tree structure corresponds to an element characteristic. The nodes for each level correspond to element characteristic values. For example, one level might correspond to "camera status", and the nodes at that level each define camera status values (e.g. operational or non-operational). A tree customization module allows a user to customize the tree structure by designating element characteristics for levels in the tree structure.

System Level Overview

Figure 1:
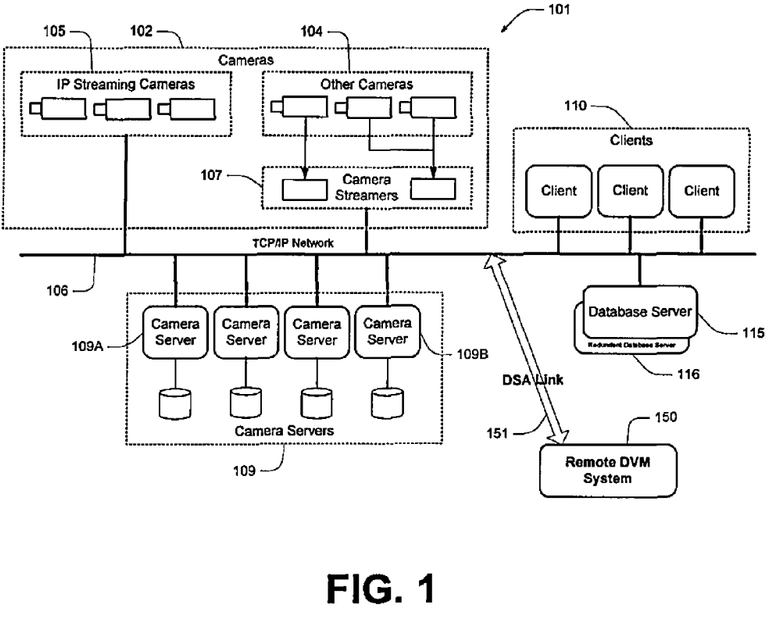
FIG. 1 schematically illustrates a DVM system according to one embodiment.

FIG. 1 illustrates a general Digital Video Management (DVM) system 101. System 101 is described to provide general context to various embodiments discussed below. Although embodiments are described by reference to DVM systems based on system 101, the present invention is not limited as such. That is, system 101 is provided as a general example to highlight various features of an exemplary DVM system. In practice, many systems omit one or more of these features, and/or include additional features. In some instances, a DVM system is defined simply by a plurality of IP streaming cameras and a server configured to maintain information regarding those cameras.

System 101 includes a plurality of video streaming units 102. Units 102 include conventional cameras 104 (including analogue video cameras) coupled to discrete video streaming units, and IP streaming cameras 105. Video streaming units 102 stream video data, presently in the form of surveillance footage, on a TCP/IP network 106. This is readily achieved using IP streaming cameras 105, which are inherently adapted for such a task. However, in the case of other cameras 104 (such as conventional analogue cameras), a discrete video streaming unit 107 is required to convert a captured video signal into a format suitable for IP streaming.

For the purposes of the present disclosure, the term "video streaming unit" should be read to include IP streaming cameras 105 and video streaming units 107. That is, the term "video streaming unit" describes any hardware component configured to stream video data onto a network, independent of the source of the originating analogue video data.

For the present purposes, the terms "video streaming unit" and "camera" are generally used interchangeably, on the assumption that each video streaming unit corresponds to a unique set of optical components used to capture video. That is, there is a one-to-one relationship between streaming units 107 and cameras 104. However, in other embodiments there is a one-to-many relationship between streaming units 107 and cameras 104 (i.e. a streaming unit is configured for connection to multiple cameras).

One or more camera servers 109 are also connected to network 106 (these may be either physical servers or virtual servers). Each camera server is enabled to have assigned to it one or more of video streaming units 102. In some embodiments the assignment is on a stream-by-stream basis rather than a camera-by-camera basis. This assignment is carried out using a software-based configuration tool, and it follows that camera assignment is virtual rather than physical. That is, the relationships are set by software configuration rather than hardware manipulation. In practice, each camera has a unique identifier. Data indicative of this identifier is included with surveillance footage being streamed by that camera such that components on the network are able to ascertain from which camera a given stream originates.

In the present embodiment, camera servers are responsible for making available both live and stored video data. In relation to the former, each camera server provides a live stream interface, which consists of socket connections between the camera manager and clients. Clients request live video through the camera server's COM interfaces and the camera server then pipes video and audio straight from the relevant streaming unit to the client through TCP sockets. In relation to the latter, each camera server has access to a data store for recording video data. Although FIG. 1 suggests a one-to-one relationship between camera servers and data stores, this is by no means necessary. Each camera server also provides a playback stream interface, which consists of socket connections between the camera manager and clients. Clients create and control the playback of video stored that the camera server's data store through the camera manager's COM interfaces and the stream is sent to clients via TCP sockets.

Although, in the context of the present disclosure, there is discussion of one or more cameras or streaming units being assigned to a common camera server, this is a conceptual notion, and is essentially no different from a camera server being assigned to one or more cameras or streaming units.

Clients 110 execute on a plurality of client terminals, which in some embodiments include all computational platform on network 106 that are provided with appropriate permissions. Clients 110 provide a user interface (UI) that allows surveillance footage to be viewed in real time by an end-user. For example, one UI component is a render window, in which streamed video data is rendered for display to a user. In some cases this user interface is provided through an existing application (such as Microsoft Internet Explorer), whilst in other cases it is a standalone application. The user interface optionally provides the end-user with access to other system and camera functionalities, including mechanical, digital and optical camera controls, control over video storage, and other configuration and administrative functionalities (such as the assignment and reassignment of cameras to camera servers). Typically clients 110 are relatively "thin", and commands provided via the relevant user interfaces are implemented at a remote server, typically a camera server. In some embodiments different clients have different levels of access rights. For example, in some embodiments there is a desire to limit the number of users with access to change configuration settings or mechanically control cameras.

System 101 also includes a DVM database server 115. Database server 115 is responsible for maintaining various information relating to configurations and operational characteristics of system 101, and for managing events within the system. In terms of events, the general notion is that an action in the system (such as the modification of data in the database, or the reservation of a camera, as discusses below) causes an event to be "fired" (i.e. published), this having follow-on effects depending on the nature of the event.

In the present example, the system makes use of a preferred and redundant database server (115 and 116 respectively), the redundant server essentially operating as a backup for the preferred server. The relationship between these database servers is generally beyond the concern of the present disclosure.

Some embodiments of the present invention are directed to distributed DVM systems, also referred to as "distributed system architecture" (DSA). In general terms, a distributed DVM system includes a plurality of (i.e. two or more) discrete DVM systems, such as system 101. These systems are discrete in the sense that they are in essence standalone systems, able to function autonomously without the other by way of their own DVM servers. They may be distributed geographically (for example in different buildings, cities or countries), or notionally (in a common geographic location, but split due to individual system constraints, for example camera server numbers, or simply to take advantage of benefits of a distributed architecture). In the context of FIG. 1, a remote system 150, communicates with the local system via a DSA link 151. For the present purposes, it is assumed that remote system 150 is in a general sense similar to the local system. Various components (hardware and software) are configured to allow communications between the systems, for example via a network connection (including, but not limited to, an Intranet or Internet connection), or other communications interface. For the sake of the present embodiments, it is assumed that the inter-system communications occur by way of TCP/IP connections, and in this manner any communications channel supporting TCP/IP may be used.

Multi Dimension Tree Display

Figure 2A:
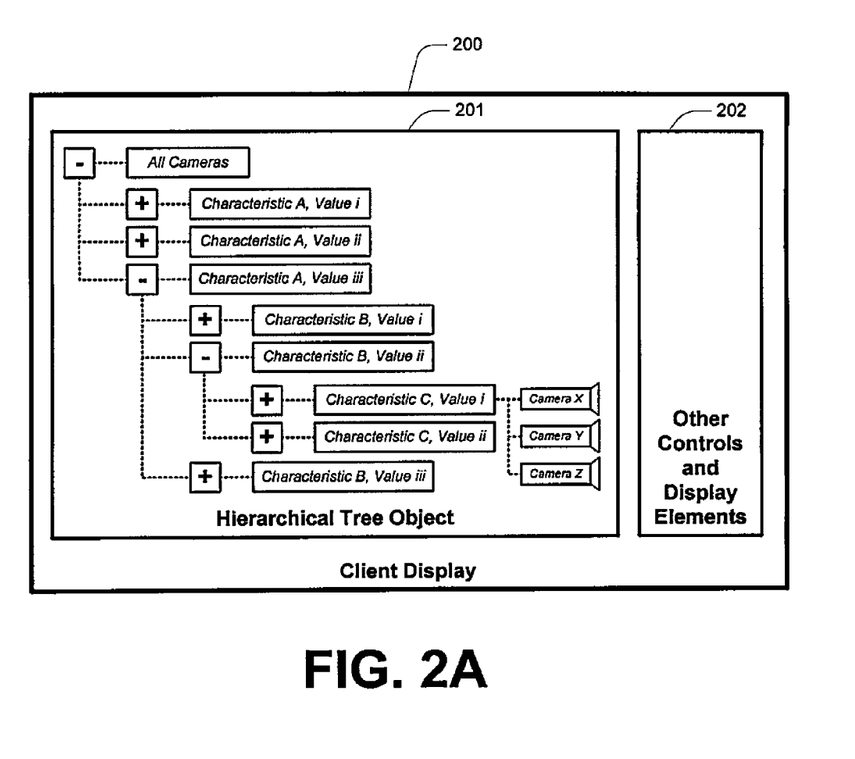
FIG. 2A illustrates a screenshot according to one embodiment.

In some embodiments, DVM system elements are displayed to a client using a hierarchical tree structure. An example of such a structure is provided in FIG. 2A, which illustrates an exemplary client display 200 upon which is rendered a hierarchical tree object 201. Other DVM controls and display elements 202 are also rendered on display 200. It will be appreciated that FIG. 2A is a screen mock-up only, designed to exemplify the nature of the tree structure. In some practical embodiments the tree structure takes up only a minor portion of the overall display.

Object 201 displays DVM system elements (e.g. cameras, camera servers, etc) in a hierarchical tree structure. The hierarchical tree structure includes a plurality of nodes. These nodes are in essence similar to file folders. Each node is associated with an element characteristic value. DVM elements having that element characteristic value are grouped under that node. The element characteristic values may relate to DVM database fields (such as values for camera server, camera location, security settings, and so on), or to a runtime status (such as recording status, operational status, and so on). So, for example, a node corresponding to an element characteristic value in the form of a camera location "main foyer" has grouped under it all cameras for which the database records a camera location of "main foyer". In some cases a given DVM element appears at multiple locations in the tree structure.

Nodes are expandable and collapsible to show/hide underlying nodes. For example, as shown in FIG. 2A, a node for "all cameras" has under it nodes for "characteristic A, value i", "characteristic A, value ii", and "characteristic A, value ii". The latter of these is expanded to reveal nodes for "characteristic B, value i", "characteristic B, value ii", and "characteristic B, value iii". Of these, "characteristic B, value ii" is expanded to reveal "characteristic C, value i" and "characteristic C, value ii". Cameras X, Y and Z are grouped under "characteristic C, value i". That in essence means those cameras have "characteristic A, value iii", "characteristic B, value ii" and "characteristic C, value i".

In some embodiments, for at least a selection of the nodes displayed in the hierarchical tree structure, a count is displayed, the count indicating the number of system elements grouped under that node.

Figure 2B:
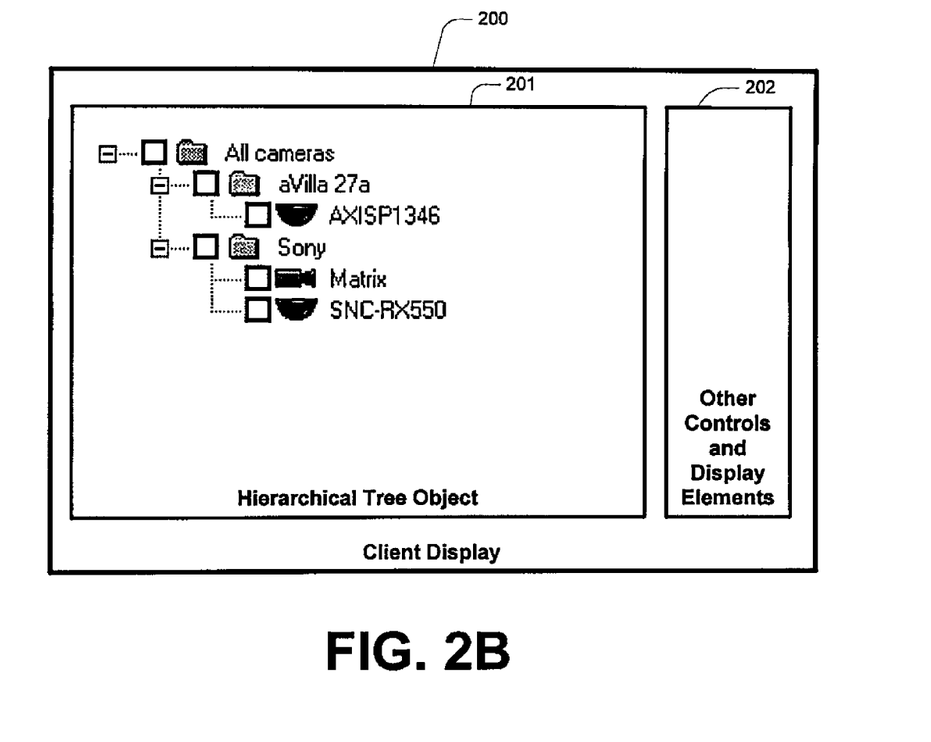
FIG. 2B illustrates a screenshot according to one embodiment.

FIG. 2B illustrates an exemplary screenshot according to a further embodiment. In this embodiment each system element is displayed alongside an icon indicative of the nature of the system element (for example the type of camera).

Some embodiments provide a tree customization module for allowing a user to customize the tree structure. Such a module is configured to receive instructions from a user indicative of
  (i) a user designated element characteristic for level in the tree structure; and
  (ii) a user designated location in the hierarchical tree structure for that level.

The element characteristics available for designation include, in some embodiments, characteristics corresponding to table fields defined in a DVM database for the DVM system. An addition (or as an alternative), the element characteristics available for designation include characteristics corresponding to runtime statuses defined for the DVM system. The structure definition module preferably allows for an unrestricted depth of nodes in the tree structure.

Figure 3:
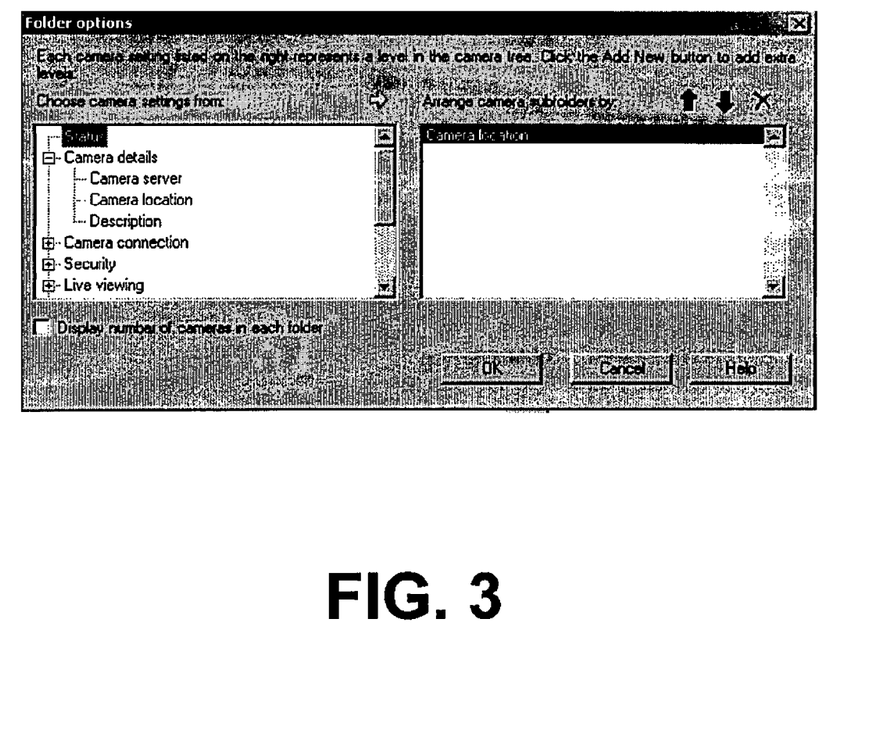
FIG. 3 illustrates a screenshot according to one embodiment.

FIG. 3 illustrates a tree customization module screenshot for one embodiment. This screenshot shows, on the left hand side, a characteristic selection object, which organizes characteristics available for designation into characteristic categories (for example a "camera details" characteristic category includes characteristics "camera server", "camera location" and "camera description"). A user selects a characteristic, and the selected characteristic appears in an organization object on the right hand side. Characteristics in the organization object are ordered according to the user's preferences in terms of hierarchical order. For example, assume a user wishes the tree to be organized first in terms of camera location, and then in terms of recording status. The user lists "camera location" and "recording status" in the organization object in that order. This causes the tree customization module to define a tree having a first level including nodes corresponding to camera location values, and under each of those nodes, a set of nodes corresponding to recording statuses.

Figure 4:
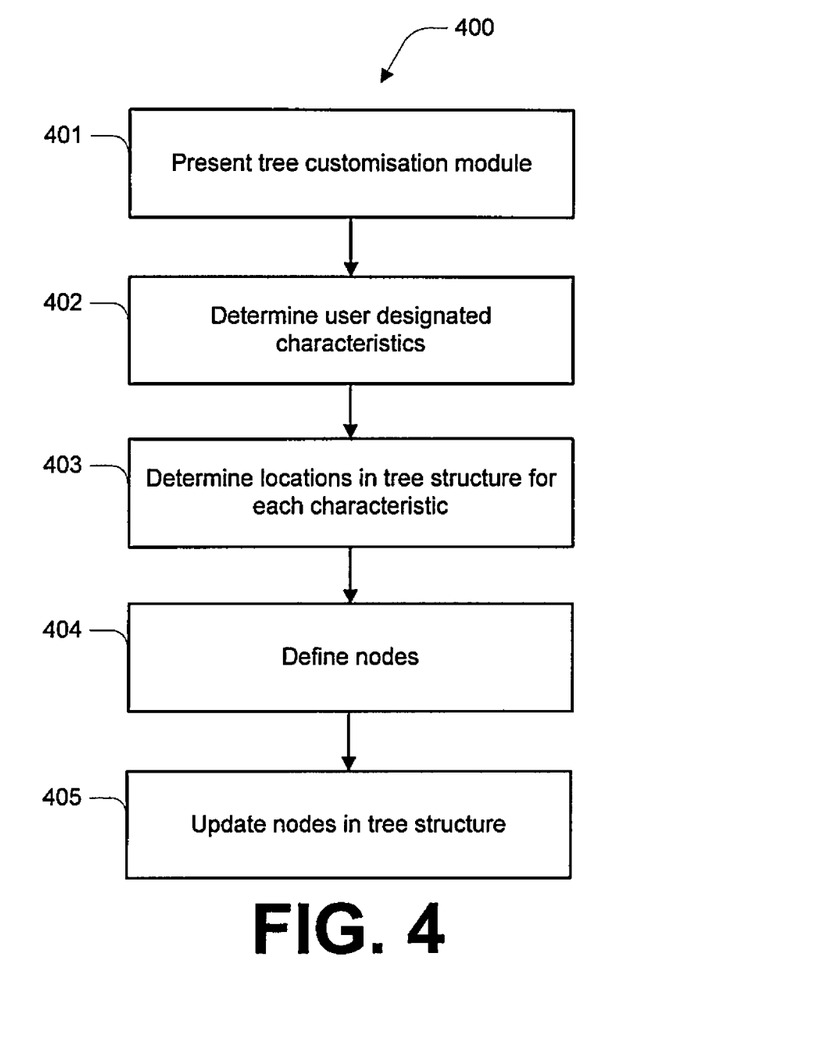
FIG. 4 illustrates a method according to one embodiment.

FIG. 4 illustrates a method 400 according to one embodiment. Method 400 is preferably performed on the basis of software instructions maintained at a DVM server, based on instructions received from a client terminal that receives data and displays the tree structure and customization module via a web browser arrangement.

Method 400 includes, at 401, presenting the tree customization module. Then, at 402 and 403, the method includes determining the user designated characteristics and, for each characteristic, the location in the tree (i.e. the level). Following this, 404 includes, defining nodes for each level. At each level, each node corresponds to a value for the user designated element characteristic. In some cases a node is defined for each possible value. In some cases nodes are defined only where there are system elements having the value (i.e. nodes are not defined if they would have no elements grouped there under). The tree structure is updated at 405 to include the defined nodes.

Persistent Selections

In some embodiments, nodes and/or elements in the tree are individually selectable. For example, this is achievable by providing a checkbox for each node and element, as shown in FIG. 2B. In some embodiments, the checkbox has the following available states:

(i) Checked an element is selected, or in the case of a node, all of the underlying nodes and elements are selected.

(ii) Unchecked the element is not selected, or in the case of a node, none of the underlying nodes or elements are selected.

(iii) Partial check some of the nodes and/or elements underlying a node are selected.

A user interacts with the checkbox to progress between the checked and unchecked states, or from the partial check state to another of the states. Progressing to the partial check state is realized by checking one or more underlying elements and/or nodes.

In some embodiments the interface provides a user-selectable functionality whereby selections are persistent in spite of reorganization of the tree structure via the tree customization module. That is, a user is able to organize the tree structure according to one nodal hierarchy, use that to identify and select desired elements, and then organize the tree according to another nodal hierarchy thereby to select further desired elements without losing the initial selections. It will be appreciated that this provides a powerful tool for selection of multiple system elements.

Conclusions and Interpretation

It will be appreciated that the disclosure above provides various significant systems and methods for presenting DVM system information. In particular, by providing a tree structure that groups system elements based on hierarchically arranged characteristics (preferably a customizable tree structure), a user is provided with a useful interface with which to navigate system elements.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A computer-implemented method for presenting Digital Video Management (DVM) system information for a DVM system, the method including:

providing an interface for displaying DVM system elements in a hierarchical tree structure, wherein the DVM system elements include hardware devices that enable the collection of surveillance footage in a DVM system wherein the hardware devices include cameras and camera servers, wherein the hierarchical tree structure includes a plurality of nodes arranged in a plurality of levels, each node corresponding to a DVM element characteristic value, such that DVM system elements having that DVM element characteristic value are grouped under that node, wherein for a given one of the DVM system elements defined by a hardware device, the DVM element characteristic value is representative of one or more of: (a) a hardware physical location; (b) a hardware physical operational status; or (c) hardware security settings;

providing a tree customization module configured to receive instructions from a user indicative of:
(i) a user designated DVM element characteristic for a level in the hierarchical tree structure, wherein the user selects the user designated DVM element characteristic from a list including the following selectable characteristic types: (a) a hardware physical location; (b) a hardware physical operational status and (c) hardware security settings; and
(ii) a user designated location in the hierarchical tree structure for that level;

in response to the instructions from the user, defining nodes for that level, wherein each node corresponds to a value for the user designated DVM element characteristic;

updating the hierarchical tree structure with the defined nodes;

providing an interactive checkbox for each node and element in the hierarchical tree structure wherein checking the checkbox causes selection of the associated element or in the case of a node causes selection of the associated node and all of the nodes and elements underlying the checked node in the hierarchical tree structure and wherein un-checking the checkbox causes deselection of the associated element or in the case of a node causes deselection of the associated node and all of the nodes and elements underlying the unchecked node in the hierarchical tree structure;

providing a user-selectable functionality whereby nodes and elements selected using the interactive checkbox remain selected as the hierarchical tree structure is updated by the user through the tree customization module, such that, in use:

when the hierarchical tree structure is presented in a first configuration, a user selects a first subset of the nodes and elements using the interactive checkboxes;

subsequently, the user provides instructions to the tree customization module to update the hierarchical tree structure to a second configuration, wherein the second configuration presents a different configuration of hierarchical tree structure elements compared with the first configuration, with relationships between a subset of the nodes and elements altered; and when the hierarchical tree structure is presented in the second configuration, the user selects a second subset of the nodes and elements using the interactive checkboxes, wherein the first subset of the nodes remains persistent selected in spite of transition from the first configuration to the second configuration, such that both the first subset of the nodes and the second subset of the nodes become simultaneously selected.

2. A method according to claim 1 wherein the DVM element characteristics available for designation include characteristics corresponding to table fields defined in a DVM database for the DVM system.

3. A method according to claim 1 wherein the DVM element characteristics available for designation include characteristics corresponding to runtime statuses defined for the DVM system.

4. A method according to claim 1 wherein, for at least a selection of the nodes displayed in the hierarchical tree structure, a count is displayed, the count indicating a number of DVM system elements grouped under that node.

5. A method according to claim 1 wherein the tree customization module allows for an unrestricted depth of nodes in the hierarchical tree structure.

6. A method according to claim 1 wherein the DVM system elements include any one or more of capture devices, streaming devices, integrated capture and streaming devices, camera servers, analytics servers, and storage mediums.

7. A method according to claim 1 wherein the tree customization module is configured to display a characteristic selection object, which organises characteristics available for designation into characteristic categories.

8. A Digital Video Management (DVM) system comprising:

an interface module for displaying at one or more client terminals DVM system elements in a hierarchical tree structure, wherein the DVM system elements include hardware devices that enable the collection of surveillance footage in a DVM system wherein the hardware devices include cameras and camera servers, and wherein the hierarchical tree structure includes a plurality of nodes arranged in a plurality of levels, each node corresponding to a DVM element characteristic value, such that DVM system elements having that DVM element characteristic value are grouped under that node, and wherein for a given one of the DVM system elements defined by a hardware device, the DVM element characteristic value is representative of one or more of: (a) a hardware physical location; (b) a hardware physical operational status; or (c) hardware security settings;

a tree customization module configured to receive instructions from a user via an input device indicative of:
(i) a user designated DVM element characteristic for a level in the hierarchical tree structure, wherein the user selects the user designated DVM element characteristic from a list including the following selectable characteristic types: (a) a hardware physical location; (b) a hardware physical operational status and (c) hardware security settings; and
(ii) a user designated location in the hierarchical tree structure for that level;

a structure definition module for, in response to the instructions from the user, defining nodes for that level, wherein each node corresponds to a value for the user designated DVM element characteristic;
an updating module for updating the hierarchical tree structure with the defined nodes;
providing an interactive checkbox for each node and element in the hierarchical tree structure wherein checking the checkbox causes selection of the associated element or in the case of a node causes selection of the associated node and all of the nodes and elements underlying the checked node in the hierarchical tree structure and wherein un-checking the checkbox causes deselection of the associated element or in the case of a node causes deselection of the associated node and all of the nodes and elements underlying the unchecked node in the hierarchical tree structure;
providing a user-selectable functionality whereby nodes and elements selected using the interactive checkbox remain selected as the hierarchical tree structure is updated by the user through the tree customization module, such that, in use:
when the hierarchical tree structure is presented in a first configuration, a user selects a first subset of the nodes and elements using the interactive checkboxes;
subsequently, the user provides instructions to the tree customization module to update the hierarchical tree structure to a second configuration, wherein the second configuration presents a different configuration of hierarchical tree structure elements compared with the first configuration, with relationships between a subset of the nodes and elements altered; and
when the hierarchical tree structure is presented in the second configuration, the user selects a second subset of the nodes and elements using the interactive checkboxes, wherein the first subset of the nodes remains persistent selected in spite of transition from the first configuration to the second configuration, such that both the first subset of the nodes and the second subset of the nodes become simultaneously.

9. A Digital Video Management (DVM) system comprising:
a DVM server including one or more processors communicatively coupled to a plurality of DVM system elements, the DVM system elements including a plurality of cameras and a plurality of camera servers;
a module, provided by the server, configured to enable rendering at one or more client terminals of a graphical interface that displays DVM system elements in a hierarchical tree structure, wherein the hierarchical tree structure includes a plurality of nodes arranged in a plurality of levels, each node corresponding to a DVM element characteristic value, such that DVM system elements, which include a plurality of cameras and a plurality of camera servers, having that DVM element characteristic value are grouped under that node, wherein for a given one of the DVM system elements defined by a hardware device, the DVM element characteristic value is representative of one or more of: (a) a hardware physical location; (b) a hardware physical operational status; or (c) hardware security settings;
a module, provided by the server, configured to enable rendering at one or more client terminals of a tree customization interface configured to receive instructions from a user indicative of:
(i) a user designated DVM element characteristic for a level in the hierarchical tree structure, wherein the user selects the user designated DVM element characteristic from a list including the following selectable characteristic types: (a) a hardware physical location; (b) a hardware physical operational status and (c) hardware security settings; and
(ii) a user designated location in the hierarchical tree structure for that level;
a module configured to, in response to the instructions from the user, define nodes for that level, wherein each node corresponds to a value for the user designated DVM element characteristic;
an updating module, provided by the server, configured to update the hierarchical tree structure with the defined nodes;
providing an interactive checkbox for each node and element in the hierarchical tree structure wherein checking the checkbox causes selection of the associated element or in the case of a node causes selection of the associated node and all of the nodes and elements underlying the checked node in the hierarchical tree structure and wherein un-checking the checkbox causes deselection of the associated element or in the case of a node causes deselection of the associated node and all of the nodes and elements underlying the unchecked node in the hierarchical tree structure;
providing a user-selectable functionality whereby nodes and elements selected using the interactive checkbox remain selected as the hierarchical tree structure is updated by the user through the tree customization module, such that, in use:
when the hierarchical tree structure is presented in a first configuration, a user selects a first subset of the nodes and elements using the interactive checkboxes;
subsequently, the user provides instructions to the tree customization module to update the hierarchical tree structure to a second configuration, wherein the second configuration presents a different configuration of hierarchical tree structure elements compared with the first configuration, with relationships between a subset of the nodes and elements altered; and
when the hierarchical tree structure is presented in the second configuration, the user selects a second subset of the nodes and elements using the interactive checkboxes, wherein the first subset of the nodes remains persistent selected in spite of transition from the first configuration to the second configuration, such that both the first subset of the nodes and the second subset of the nodes become simultaneously selected.

10. A DVM system according to claim 9 wherein the DVM element characteristics available for designation include characteristics corresponding to table fields defined in a DVM database for the DVM system.

11. A DVM system according to claim 9 wherein the DVM element characteristics available for designation include characteristics corresponding to runtime statuses defined for the DVM system.

12. A DVM system according to claim 9 wherein, for at least a selection of the nodes displayed in the hierarchical tree structure, a count is displayed, the count indicating a number of DVM system elements grouped under that node.

13. A DVM system according to claim 9 wherein the structure definition module allows for an unrestricted depth of nodes in the hierarchical tree structure.

14. A DVM system according to claim 9 wherein the DVM system elements include any one or more of capture devices, streaming devices, integrated capture and streaming devices, camera servers, analytics servers, and storage mediums.

15. A DVM system according to claim 9 wherein the tree customization interface is configured to display a characteristic selection object, which organizes characteristics available for designation into characteristic categories.

* * * * *